United States Patent [19]
Adams

[11] Patent Number: 5,889,820
[45] Date of Patent: Mar. 30, 1999

[54] SPDIF-AES/EBU DIGITAL AUDIO DATA RECOVERY

[75] Inventor: Robert W. Adams, Acton, Mass.

[73] Assignee: Analog Devices, Inc., Norwood, Mass.

[21] Appl. No.: 727,020

[22] Filed: Oct. 8, 1996

[51] Int. Cl.[6] .............................. G11B 5/09; H03D 3/00
[52] U.S. Cl. .................. 375/282; 375/282; 375/333; 375/361; 375/364; 375/374; 375/376; 360/42; 360/44; 360/51
[58] Field of Search ..................... 375/282, 333, 375/359–361, 376; 341/68, 70; 360/42, 44, 51

[56] References Cited

U.S. PATENT DOCUMENTS

| | | | |
|---|---|---|---|
| 4,052,558 | 10/1977 | Patterson | 178/68 |
| 4,242,755 | 12/1980 | Gauzan | 375/361 |
| 4,308,423 | 12/1981 | Cohen . | |
| 4,603,429 | 7/1986 | Carver . | |
| 4,745,626 | 5/1988 | Wells | 375/87 |
| 4,748,669 | 5/1988 | Klayman . | |
| 4,841,572 | 6/1989 | Klayman . | |
| 4,866,774 | 9/1989 | Klayman . | |
| 4,992,790 | 2/1991 | Montgomery | 341/70 |
| 5,026,051 | 6/1991 | Lowe et al. . | |
| 5,046,097 | 9/1991 | Lowe et al. . | |
| 5,052,685 | 10/1991 | Lowe et al. . | |
| 5,105,462 | 4/1992 | Lowe et al. . | |
| 5,163,067 | 11/1992 | Wight et al. | 375/282 |
| 5,208,860 | 5/1993 | Lowe et al. . | |
| 5,371,799 | 12/1994 | Lowe et al. . | |
| 5,404,362 | 4/1995 | Meitner . | |
| 5,412,731 | 5/1995 | Desper . | |
| 5,436,975 | 7/1995 | Lowe et al. . | |
| 5,459,765 | 10/1995 | Meyer et al. | 375/360 |
| 5,598,446 | 1/1997 | Van Der Tuijn | 375/373 |
| 5,671,258 | 9/1997 | Burns et al. | 375/359 |

FOREIGN PATENT DOCUMENTS 0 453 063   10/1991   European Pat. Off. ........ H04L 24/59

OTHER PUBLICATIONS

International Search Report from PCT/US97/17934, filed Oct. 3, 1997.

*Primary Examiner*—Amanda Le
*Attorney, Agent, or Firm*—Wolf, Greenfield & Sacks, P.C.

[57] ABSTRACT

A circuit for decoding an input signal includes a measurement circuit having an input to receive a timing clock signal that is asynchronous with clocking of the input signal, to measure duration of a plurality of pulses received on the input signal in relation to frequency of the timing clock signal and a decode circuit to decode the input signal into digital data. In one embodiment, the circuit may include a servo mechanism for generating the timing clock signal to have a frequency that varies in response to variations in frequency of clocking of data on the input signal. The servo mechanism may include a digitally controlled oscillator and a feedback circuit, to control the digital frequency of the digitally controlled oscillator in response to variation of clocking of data on the input signal. The invention permits use of all digital components for decoding digital audio data encoding using biphase-mark encoded data according to the SPDIF or AES/EBU standards.

16 Claims, 10 Drawing Sheets

SPDIF-AES/EBU DIGITAL AUDIO DATA RECOVERY

FIELD OF THE INVENTION

The present invention relates generally to methods and circuits for digital data recovery. More particularly, the present invention relates to a method and circuit for recovering digital audio data from an input signal carrying data formatted according to the SPDIF, AES/EBU, or similar, standard for encoding the digital information in the input signal.

DESCRIPTION OF THE RELATED ART

Digital data communications have a wide variety of applications. One such application includes transmission and reception of digital audio data. Here, as in other applications, an input signal is processed by a receiver circuit. The receiver circuit decodes the input signal into a digital data stream together with a digital clocking signal corresponding to the data stream. Indeed, the frequency of the transmitted data may vary over time. Accordingly, receiver circuits (also referred to as decoding circuits) should be capable of tracking changes in the clocking of the incoming data.

Two (similar) standards have achieved widespread recognition and use for encoding of digital audio data—Sony Philips Data Interface Format ("SPDIF") and a standard promulgated by the Audio Engineering Society/European Broadcasting Union ("AES/EBU"). The SPDIF format is most often used in products directed to the consumer market. The AES/EBU format is most often used in equipment for professional applications.

Both AES/EBU and SPDIF standards use a biphase-mark encoded (also known as "Manchester encoded") data stream to transmit digital audio information in serial format. With biphase-mark encoding, a cell (i.e., a period where one bit of data is transmitted) always starts with a transition (or "edge") of the signal (i.e., from 0 to 1 or 1 to 0) and ends with a transition of the signal. If a transition occurs in the middle of the cell, a 1 is encoded. Otherwise, a 0 is encoded.

The length of a data cell (which may actually vary, depending on the frequency of the input signal and any drift in the signal) may be referred to as T. Thus, if a cell begins at time 0, the cell ends at time 1T. If a transition is detected at time 0.5T, a 1 has been encoded. If no transition occurs at time 0.5T, a 0 has been encoded.

FIG. 1 illustrates an example of biphase-mark encoding. A clock signal 11 is illustrated for reference purposes. The illustrated clock rate is twice the data transmission rate. A signal 12 illustrates sample data to be transmitted using biphase-mark encoding. A signal 13 illustrates the sample data, after biphase-mark encoding.

A cell may begin at a time indicated in FIG. 1 at 15a. The data bit to be encoded for the first cell in the sample data is a 1, as illustrated at 15d. At 0.5T (indicated at 15b), a transition should occur to indicate that the data to be transmitted is a 1. Accordingly, the biphase-mark encoded data has a transition at 0.5T, as indicated at 15c. Because each cell begins and ends with a transition, at the time indicated at 15c in FIG. 1, another transition occurs in the biphase-mark encoded data, as indicated at 15f. This transition indicates both the end of the previous cell and the beginning of a new cell. The data for the new cell is 0, as indicated at 16b. Because the data is a 0, no transition should take place in the biphase-mark encoded data signal. Accordingly, at 16c, the biphase-mark encoded data remains at 1. At the end of the cell, indicated at 16d, an additional transition takes place in the biphase-mark encoded data (16e).

Use of biphase-mark encoding has several advantages. First, the data is DC-free. That is, any biphase-mark encoded data will spend as much time at its low signal value as at its high signal value (because a cell transition takes place at each cell boundary). Accordingly, the signal may be passed through coupling capacitors.

Second, biphase-mark encoding is self-clocking. That is, every cell starts and ends with a transition. Accordingly, as explained in more detail below, the biphase-mark encoded data can be used to generate or recover a clock signal for use with the data.

Finally, because the data information is carried only by transitions in the biphase-mark encoded data signal, the polarity of the signal can be arbitrary/unimportant. Because data is transmitted based on duration between edges, communication of data is made based on both duration of high (1) pulses and duration of low (0) pulses. Thus, "pulses" of the input signal, as used herein, may refer to both high pulses and low pulses of the input signal.

Biphase-mark encoding is a method for transmitting individual bits of data. The SPDIF and AES/EBU standards also provide a format for arranging the bits of data into frames, subframes and blocks.

FIG. 2 illustrates the frame and block format used in SPDIF and AES/EBU standard formats. The frames typically are organized into blocks of frames. Conventionally, 192 frames may be in a block. The blocks do not necessarily organize the audio data components within the block, but may be used to organize the non-audio data bits (described with reference to FIG. 3).

Two channels of audio data are transmitted, including channel A, 21, and channel B, 22.

The beginning of each block of frames is signaled by a unique preamble, described in greater detail below with reference to FIG. 4. The start of the block of frames 26 is indicated by a preamble Z. Transmission of the Z preamble also indicates that one of the channels of audio data is going to be transmitted—channel A data, as illustrated in FIG. 2. Subsequent transmissions of channel A and B data within a block of frames are identified by unique preambles X and Y, respectively.

A frame refers to the transmission of one set of digital audio data for channel A and channel B, together with the associated preambles and any auxiliary data or non-audio data bits. A frame consists of two subframes, e.g., subframes 27a and 27b. A subframe includes one channel's audio data together with its associated preamble and any auxiliary data or non-audio data bits.

FIG. 3 illustrates the sub-frame format used in the SPDIF standard. Bit positions b0 to b31 within the subframe are indicated at 37. The subframe includes a preamble 33, which is described in greater detail with reference to FIG. 4. Auxiliary data 34 may be included to provide nonaudio information. Audio data 35 is included, typically organized from least significant bit to most significant bit. Four additional bits of non-audio data also are included at 36. These bits may include a validity bit, to indicate whether the data within the subframe is valid, a user data bit, a channel status data bit, and a parity bit.

The AES/EBU standard format is similar. The primary differences are that the use of the user data and channel status data bits differ and that some or all of the auxiliary data bits 34 may be used as part of the audio data 35, rather than as a separate field of the subframe. As is apparent from the above and as would be apparent to one of ordinary skill in the art, SPDIF and AES/EBU standard formats necessarily involve transmission of a digital signal encoded using biphase-mark encoded data. Thus, one receiver decoding circuit may be employed for reception and decoding of data following either the SPDIF or AES/EBU standards.

FIG. 4 illustrates the three preambles X, Y and Z, used in SPDIF and AES/EBU standard formats. The normal cell markers for a digital stream are illustrated at 41–45. If the cell beginning at 41 is considered to begin at time 0, then it can be observed that there is no transition at the other boundary of the first cell 42. Instead, each of the preambles X, Y and Z, begins with a digital pulse that is 1.5T in duration—a violation of the biphase-mark encoding rule that each (1T) cell is bordered by a transition. Thus, each preamble begins with a code violation to distinguish the preamble from any other event in the data stream. The remaining two cells 43–45 include additional transitions that distinguishes among the preambles X, Y and Z.

As noted above, biphase-mark encoding has the advantage of providing a self-clocking data signal. Conventionally, manufacturers of digital audio equipment have employed a classic analog phase-locked loop (PLL) to recover a clock signal from the data signal. In these devices, a digital edge-triggered phase detector is coupled to a voltage-controlled oscillator (VCO). Through a feedback loop, the VCO is used to generate an independent clock signal having a frequency designed to match the clocking of the incoming biphase-mark encoded data signal.

Often, it is desirable to include all of the components of a receiver circuit on a single, integrated circuit chip. In many situations, the input signal is preprocessed (for example, amplified or processed by a comparator or data slicer) before being processed by the decoding circuit. This preprocessing may take place using separate components within the same, or on a separate, integrated circuit chip.

Conventional circuits suffer from the following drawback. Consider a data signal that is all 0's. The biphase-mark encoded data would be a signal that has an edge transition on each cell boundary, and no edge transitions between cell boundaries. In this situation, the incoming signal would be a square wave with a frequency equal to the frequency of the transmitted data. Now consider encoding a data signal having all 1's. The biphase-mark encoded data signal would have edge transitions on each boundary of a cell and an edge transition in the middle of each cell. In this example, the incoming signal would also be a square wave, but would have a frequency of twice the rate of data transmission. Thus, it can be difficult to tell from an incoming signal whether the clock rate corresponds to encoding of 0's or 1's. In addition, the frequency of the incoming signal varies depending on the data being encoded. This can result in false locking in the recovered clock signal or locking on an incorrect frequency. In addition, the analog PLL can result in jitter in the recovered clock signal.

One alternative is to generate a clock signal based on the amount of time that passes between preamble signals. This approach was employed in the system disclosed in U.S. Pat. No. 5,404,362, issued to E. Meitner. According to the Meitner patent, violations in the coding scheme in the preambles are detected by integrating the incoming data signal and resetting on every edge. (The integration of the signal produces an analog voltage that is highest when the temporal length of an incoming pulse is the longest. Thus, when the 1.5T code violation in a preamble is present on an incoming signal, the integrated voltage is higher than at any other point in time for the incoming signal (where the integrated voltage corresponds to either a 0.5T or 1T pulse).)

In the Meitner system, an analog PLL is used to generate the system clock. The PLL includes a VCO that is controlled by a voltage set according to the frequency of the detected preambles.

The system disclosed in Meitner has several drawbacks. First, the circuit generates a clock signal only from the time passing between transmission of preambles. Accordingly, if there is drift in the incoming data signal between preambles, then the Meitner system cannot respond to such drift. Second, in many implementations, the biphase-mark decoding and regeneration of clock signals need to be implemented on an integrated circuit chip that performs additional digital functions. The use of analog components in the Meitner system, however, makes it more difficult to implement both functions in one integrated circuit, due to increased difficulties in the manufacturing process and to interference with digital functions caused by noise associated with the operation of the analog components.

Another approach would be to assume that the incoming input is clocked at one of a fixed number of standard sample rates. The input signal may be decoded, and a clock signal recovered from the input signal, by determining which of the three possible input rates would result in decoding of coherent data (e.g., the fewest parity errors). Where the frequency of clocking of the input signal is known, a one-shot circuit may be employed. In a one-shot circuit, the circuit detects the first transition marking a cell boundary. The circuit then delays for a fixed period of time (e.g., three-quarters of a cell width) and determines if a transition has taken place. If so, a 1 was encoded. Otherwise, a 0 was encoded. Such circuits cannot, however, track changes in input frequency and are rigid in application due to the need to assume that only one of a few fixed sample rates may be input.

Accordingly, it is an object of the present invention to provide improved method and apparatus for decoding digital information from an incoming signal.

SUMMARY OF THE INVENTION

The present invention provides a method and circuit for decoding an input signal that contains digital data. In one embodiment of the invention, a circuit for decoding an input signal is provided. The circuit includes a measurement circuit to measure the duration of a plurality of pulses received on an input signal, the measurement being made relative to the frequency of a timing clock signal. The timing clock signal is asynchronous with clocking of the input signal. The circuit further includes a decode circuit, to decode the input signal into digital data. The circuit may further include a servo mechanism, to adjust the timing clock signal in response to variations in frequency of the clocking of data on the input signal.

According to another embodiment of the present invention, a circuit for decoding an input signal that includes digital data encoded according to a coding scheme that has a maximum pulse width for encoded data and which includes at least one extended pulse that has a width greater than the maximum pulse width, as disclosed. In this embodiment, the circuit comprises a measurement circuit to measure the duration of a plurality of pulses received on the input signal. The measurement is made relative to the width of the extended pulse. The circuit further includes a decode circuit, to decode the input signal into the digital data. This embodiment may further include a servo mechanism to track and compensate for changes in frequency of clocking of encoded data on the input signal. The changes in frequency may be detected by reference to the duration of the extended pulses on the input signal.

According to another embodiment of the present invention, a circuit for decoding an input signal that includes biphase-mark encoded digital data is provided. This circuit includes a circuit to derive a bit clock signal from the input signal and a decode circuit to decode the biphase-mark encoded data. The decode circuit includes a servo mechanism to track and compensate for changes in frequency of the clocking of data on the input signal.

According to another embodiment of the invention, a method of decoding an input signal that includes digital data encoded according to a coding scheme having a maximum pulse width for the encoded data and including at least one extended pulse having a width greater than the maximum pulse width, is disclosed. The method includes the steps of measuring a duration of each of a plurality of pulses on the input signal and decoding the input signal based on the measured duration of the pulses. The method may further include the steps of providing a timing clock signal that is asynchronous to clocking of data on the input signal and measuring the duration of the plurality of pulses in relation to the timing clock signal.

DETAILED DESCRIPTION

Figure 5:
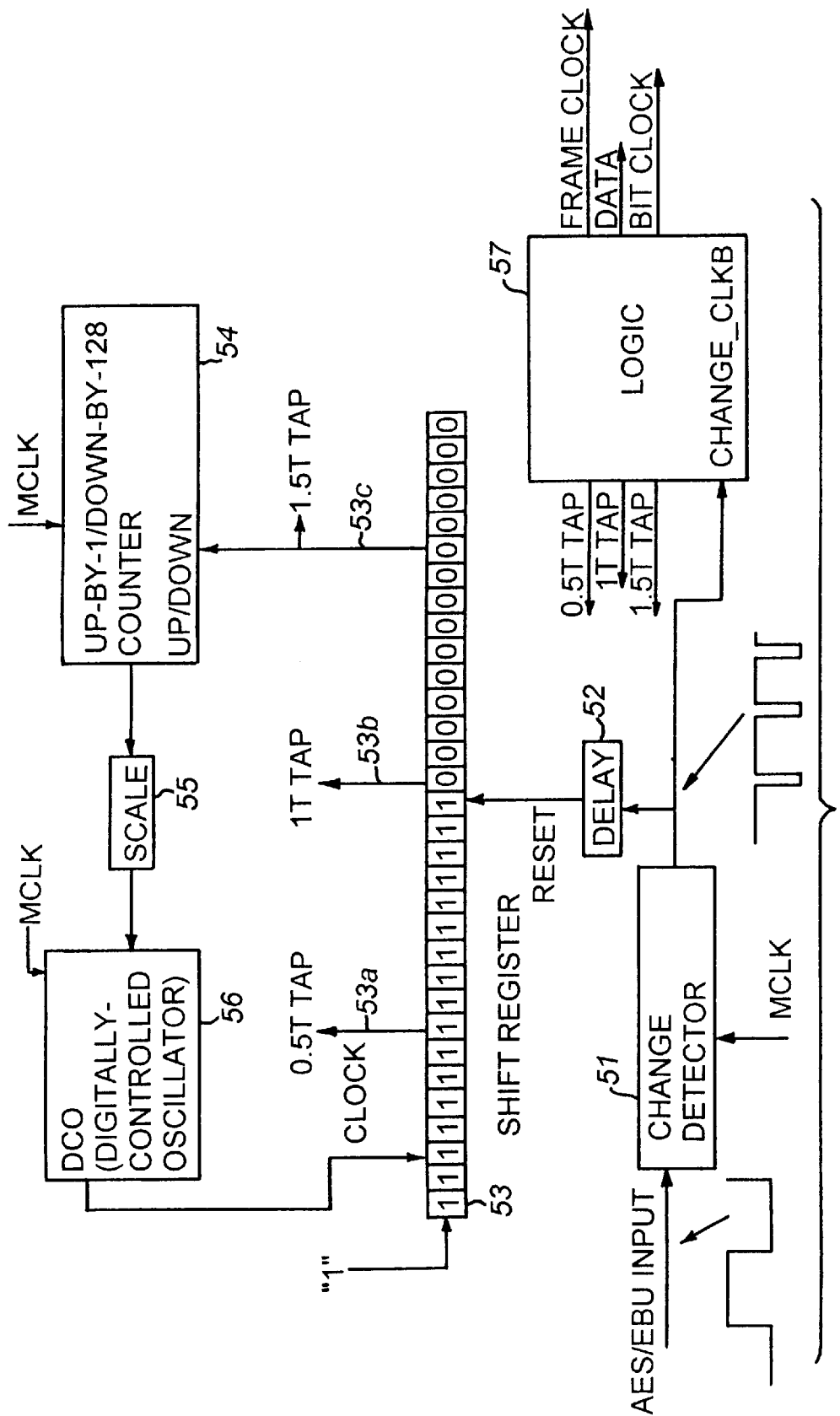
FIG. 5 is a block diagram of a decoding circuit according to the present invention.

FIG. 5 illustrates a preferred embodiment of the present invention. A master clock MCLK is provided. Preferably, the frequency of the master clock is significantly higher than the frequency of the incoming biphase-mark encoded data stream. The clocking of the master clock may be asynchronous with the clocking of the biphase-mark encoded data.

The input signal is coupled to a change detector 51, also referred to as a transition detector. The transition detector may be clocked off of the master clock MCLK. In a preferred embodiment, the change detector 51 is clocked off of both edges (i.e., up and down transitions) of the master clock MCLK.

The change detector 51 generates a signal having a pulse whenever a change is detected on the input signal. The change detector can be implemented readily by one of skill in the art. For example, the change detector can be implemented using flip flops clocked off of the master clock. Alternatively, various delay circuits could be employed to implement the change detector.

The output of the change detector is provided as a clock signal to decoding logic 57. The output of the change detector also is coupled to a delay element 52. The output of the delay element 52 is coupled to the reset input of a shift register 53. The delay element permits clocking of the logic element 57 just before resetting the shift register 53.

The shift register 53 has a shift input that always is set to be 1 in this example. The shift register 53 further has a clock input. Thus, the shift register 53 serially shifts in a 1 for each clock pulse, up until the point in time when the shift register is reset by a pulse on its reset input. Because the reset is triggered by a pulse received from the change detector 51, the shift register will fill with the number of 1's corresponding to the number of pulses on the clock input of the shift register that occur between transitions detected on the incoming signal. At a transition, the shift register 53 is reset and the shift register fills with 1's again, until the next transition occurs.

The shift register 53 includes "taps" 53a–53c for providing data. For example, the 0.5T tap 53a is positioned to correspond to the place on an input data stream where 0.5T has passed between transitions. Similarly, the 1T tap 53b is positioned to correspond to the place on an input data stream where 1T has passed between transitions (that is, the period of time for one cell in the biphase-mark encoded data input). Finally, the 1.5T tap 53c is intended to correspond to a period of time between detected transitions on the input signal that correspond to a 1.5T pulse.

Thus, the shift register 53 fills up with 1's until a pulse from the change detector 51 resets the shift register. The shift register 53 then begins to fill up again with 1's until the next edge/transition on the input signal occurs. Three taps 53a, 53b, and 53c, respectively correspond to half-cell (0.5T) interval, full-cell (1T) interval and 1.5-cell (i.e., a code violation) interval (1.5T). The three taps are latched in time just before the shift register is reset (due to delay element 52). The highest of the three tap signals to record a 1 corresponds to the length between transitions in the biphase-mark data stream. The following table shows the characterization of the cell based on the output from the three taps 53a, 53b and 53c.

| Incoming Signal | .5T (53a) | 1T (53b) | 1.5T (53c) |
| --- | --- | --- | --- |
| Half-cell | 1 | 0 | 0 |
| Full-cell | 1 | 1 | 0 |
| 1.5T cell (code violation) | 1 | 1 | 1 |

For the taps 53a, 53b and 53c to properly decode the data, the frequency of the clock signal that is input to the shift register 53 must be properly adjusted. If the frequency were too high, then a half-cell interval might be interpreted as a full-cell interval, as the leading 1 in the shift register might cross the point where the full-cell tap 53b is located. On the other hand, if the frequency of the clock input to the shift register 53 were too low, a full-cell interval might not cause the leading 1 to cross the 1T tap 53b and, therefore, the interval would be interpreted as a 0.5T-cell interval.

Thus, assuming that the taps are in fixed locations on the shift register 53, the clock signal for the shift register 53 should be set at an appropriate frequency. The clock frequency should be such that the shift register 53 fills to the appropriate level (and no further) for 0.5T, 1T, and 1.5T, pulses on the incoming data signal. Preferably, the clock signal will be generated to automatically adjust to changes in the clocking of the biphase-mark encoded data. Thus, in a preferred embodiment, the clock for the shift register 53 will adjust automatically to changes in the clocking of the incoming data signal and to drift in that signal.

FIG. 5 also illustrates a preferred embodiment of a servo loop that may be used to adjust the shift register 53 clock signal automatically, so that proper detection of all cell widths is possible for a wide range of input sample-rates. A counter 54 is clocked from the master clock signal MCLK. The counter further has an up/down input coupled to the 1.5T tap 53c. When the 1.5T tap 53c has a 0 value (i.e., 1.5T period has not passed since the last edge on the input signal), the counter 54 will count up by one, at the rate of the master clock signal MCLK. When the value at the 1.5T tap 53C is a 1, the counter 54 counts down by larger increments. In one embodiment, the counter counts down in steps of 128.

The output of the counter is scaled down for input to a digitally controlled oscillator (DCO) 56. The scaling down could be accomplished by a separate scaling component 55, or, in a preferred embodiment, the output of the counter 54 is scaled by using only the upper bits of the counter 54.

The DCO 56 is clocked off of the master clock signal MCLK. The frequency of the DCO is determined by the output of the counter 54.

The DCO 56 can be implemented in a variety of ways, as is known in the art. Conventionally, an overflowing accumulator may be used. In one embodiment, the DCO 56 is clocked off of both of the up and down edges of the master clock signal MCLK. This permits an effective doubling of the clock rate into the DCO 56. The output of the DCO 56 is used as the clock input to the shift register 53.

Operation of the servo system illustrated in FIG. 5 will now be described. Because the 1.5T-width cells represent a code violation, the only time that a 1.5T cell is detected is when the 1.5T width cell is used as a part of a preamble for framing the structure of the data, as described above. Thus, the total time for all 1.5T-width cells should be a constant percentage of the entire input signal. Accordingly, if the frequency of the DCO 56 is correct, then the number of clock cycles of the DCO 56 during which the leading 1 in the shift register exceeds the 1.5T tap position 56c, is fixed.

Figure 6A:
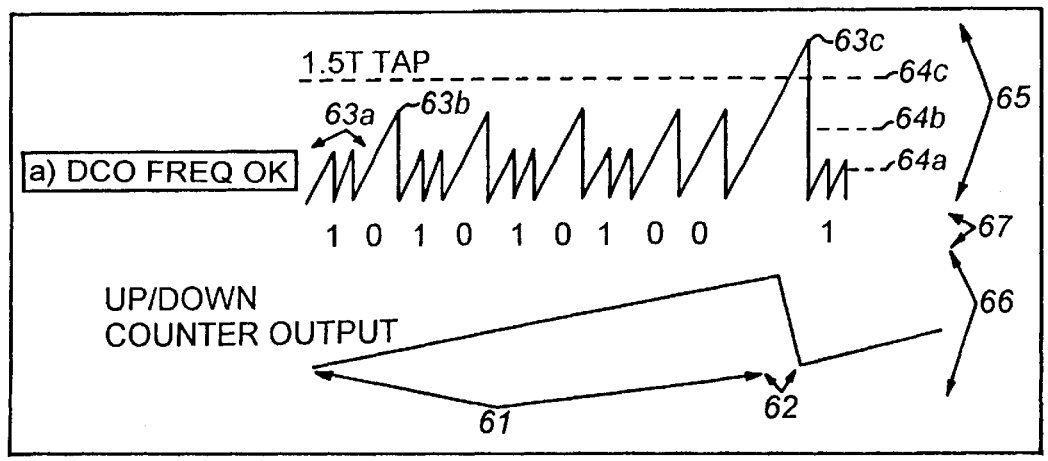
FIGS. 6A, 6B and 6C are examples of operation of the circuit of FIG. 5.

FIG. 6A illustrates the functioning of the circuit of FIG. 5, when the DCO 56 output clock frequency is acceptable. An input data stream is illustrated at 67. The position of the leading 1 in the shift register 53 is illustrated at 65. Thus, when a 1 is encoded, two 0.5T pulses are transmitted (according to biphase-mark encoding), as illustrated at 63a. When a 0 is transmitted, no transition occurs within a cell. Accordingly, the leading 1 in the shift register 53 reaches a higher peak, as shown at 63b. Finally, when a 1.5T pulse (corresponding to a code violation in a preamble) is transmitted, the leading 1 in the shift register 53 reaches the highest peak, as shown at 63c. Positions in the shift register for the 0.5T tap (53a), 1T tap (53b) and 1.5T tap (53c), that permit proper decoding of the biphase-mark encoded data are illustrated at 64a, 64b and 64c, respectively.

The output of the counter 54 is illustrated at 66. During transmission of data within a subframe, none of the transitions result in a leading 1 passing the 1.5T tap 53c. Accordingly, the counter steadily counts up during a region shown at 61. During a preamble, as shown at 63c, the 1.5T tap will have a 1 value. Accordingly, the counter will count down at a greater rate, as illustrated at 62.

Assuming that the up/down counter counts up by increments of 1 and down by increments of 128, the counter 54 will quickly reach a mode of operation where the ratio of the number of master clock MCLK cycles during which the leading 1 has passed the 1.5T tap 53c to the number of master clock cycles MCLK during which the leading 1 has not passed the 1.5T tap 53c, is 128.

The parameters to count up by 1 and down by 128 for the digital audio application were selected for performance optimization, based on simulations. It should be appreciated, however, that other values may be used in this application and in other applications.

Figure 6B:
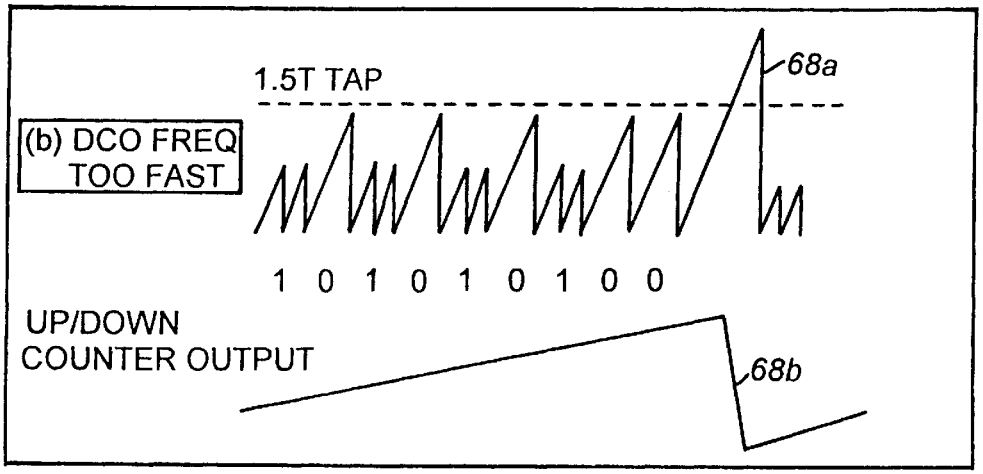

FIG. 6B illustrates how the circuit of FIG. 5 adjusts the frequency of the clock signal output from the DCO 56, when the frequency is initially too fast. When the frequency is too fast, the peak corresponding to a 1.5T cell is too high, as shown at 68a. Accordingly, the counter 54 will count down by 128 an additional number of cycles. As shown at 68b, the current state (and output) of the counter 54 will be decreased by a larger amount than in steady state operation, as illustrated in FIG. 6a at 62. Thus, the circuit of FIG. 5 automatically adjusts the frequency of the DCO 56 to a slower frequency to correspond to the clock of the incoming signal.

Figure 6C:
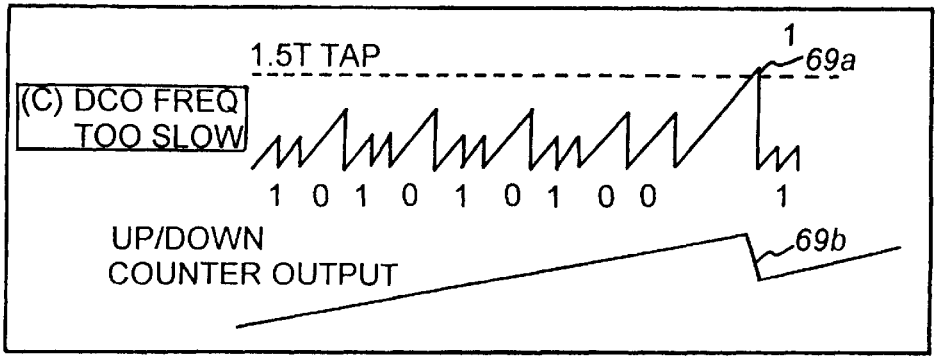

FIG. 6c illustrates how the circuit of FIG. 5 responds to adjust the frequency of the clock output of the DCO 56, when the frequency is initially too slow. As shown at 69a, the peak of a 1.5T pulse is too low. Accordingly, fewer 1's pass the 1.5T tap 53c. As a result, the output of the counter 54 is decreased by a smaller amount, as shown at 69b, than when the circuit is in its steady state operation, as shown at 62 in FIG. 6A. Accordingly, the circuit of FIG. 5 automatically adjusts to increase the frequency of clocking or the shift register 53.

In sum, if the frequency of the output of the DCO 56 is too low, then the counter 54 will not count down by 128 as often as when it is not too low. The value of the counter will increase, thereby increasing the frequency of the output of the DCO 56. Similarly, if the frequency is too high, then counter 54 will count down by 128 more often than when it is not too high, thereby decreasing the frequency of the output of the DCO 56. In this way, the frequency of the output of the DCO 56 is automatically adjusted so that the leading 1 in the shift register 53 always reaches about the same position for a pulse width of 1.5T.

This permits robust detection of the three different pulse widths. In particular, the tap positions 53a, 53b and 53c can be located in an optimal position for detecting the width of pulses. Thus, in FIG. 6A, the taps 74a–c can be located to minimize the risk that jitter or noise on the incoming signal will cause incorrect decoding of the biphase-mark encoded data.

While the preferred embodiment of the invention described above uses a shift register 53 that allows shifts in a 1, the invention need not be so limited. For example, a counter could be used for timing the number of beats of the output of the DCO, in order to time the period between edge transitions detected by the change detector 51. In addition, a number of other mechanisms could be employed to time the period between edge transitions, to allow a servo mechanism to adjust the timing of a clock signal, and for decoding the input signal.

A number of alternatives to that shown and described also exist for implementing the servo mechanism. Based on the disclosure herein, other feedback mechanisms could be designed readily by one of skill in the art. In addition, other mechanisms could be designed to adjust the circuit to track changes in the clocking of the incoming data signal. For example, rather than adjusting the frequency of clocking of a shift register as in the embodiment described above, a shift register with leading 1's could be used, the shift register being clocked at a constant rate. To respond to changes in clocking of the input signal, rather than adjusting the clock in order to track the clocking of the incoming data, as in the embodiment described above, the tap positions could be adjusted to correspond to the correct location for detection of 0.5T, 1T and 1.5T pulses. Thus, as the frequency of the incoming signal increases, the time between pulses decreases. In response, rather than adjusting the clock rate for the shift register 53, taps 53a, 53b and 53c could be moved closer to the least significant bit of the shift register. Similarly, if the frequency of the clocking for the input signal decreases, then the time between edge transition increases, and the taps 53a, 53b and 53c could be moved toward the most significant bit of the shift register in response.

Figure 1:
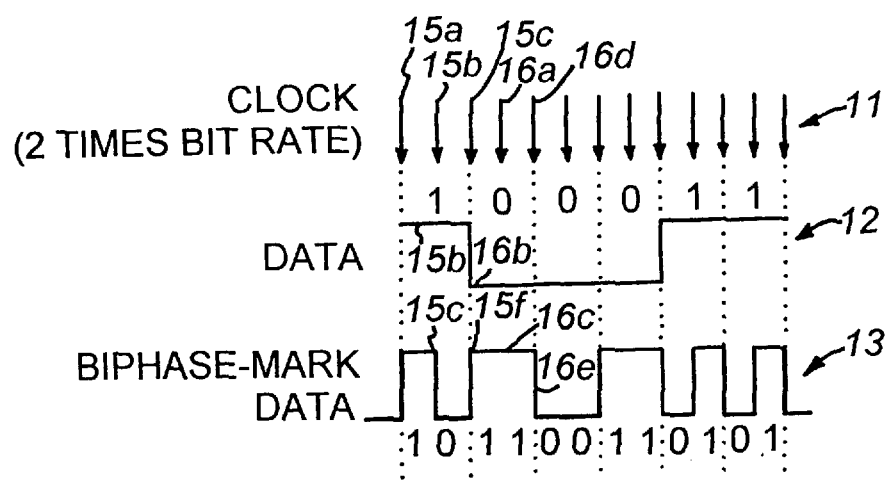
FIG. 1 illustrates an example of biphase-marking encoding of data.
Figure 2:
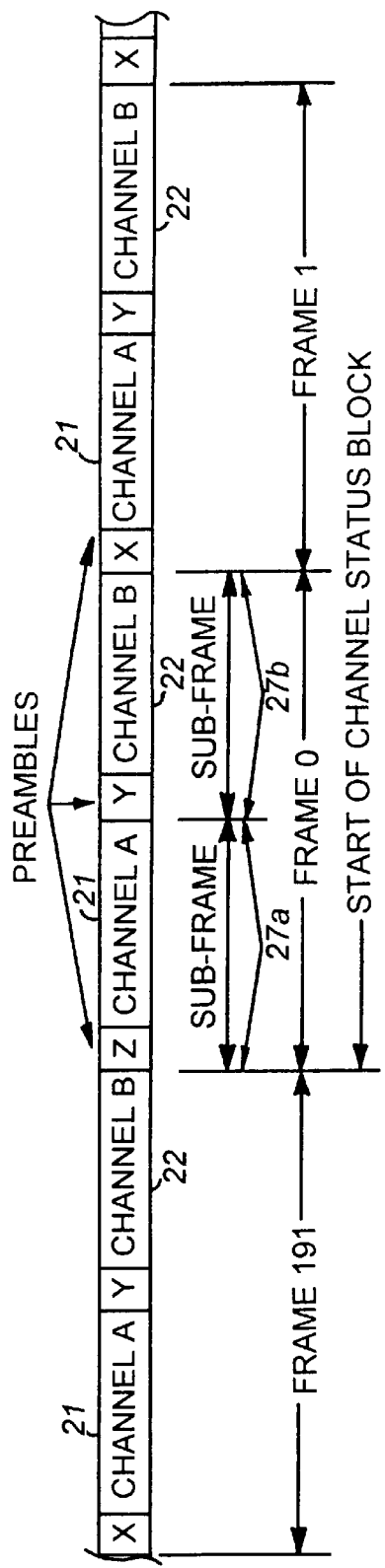
FIG. 2 illustrates the SPDIF and AES/EBU standard formats for frames of digital audio data.
Figure 3:
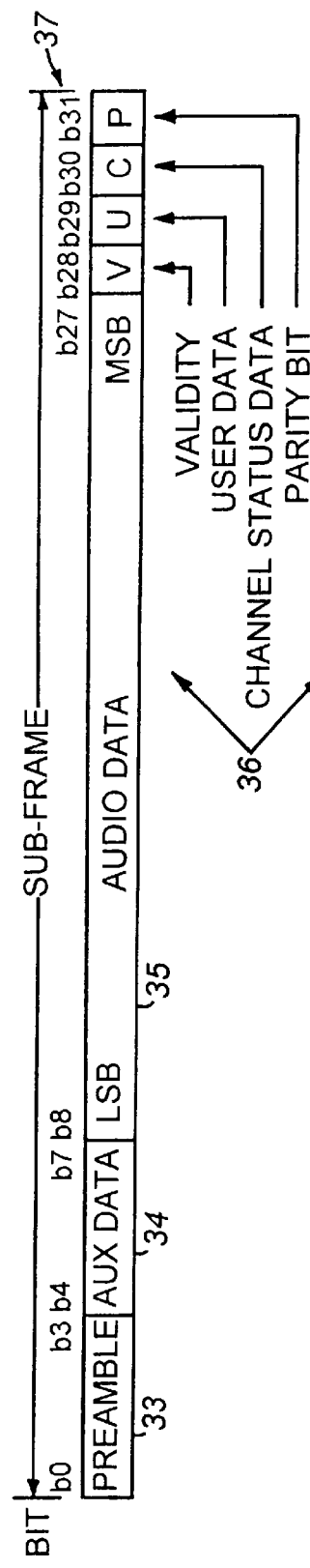
FIG. 3 illustrates the SPDIF standard format of a subframe including digital audio data.
Figure 4:
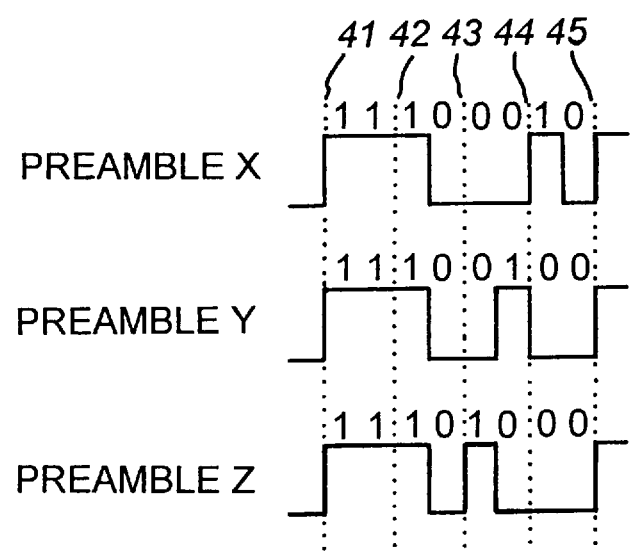
FIG. 4 illustrates the coding of preamble according to the SPDIF and AES/EBU standard formats.

Returning to FIG. 5, the taps 53a, 53b and 53c on the shift register can be used to determine a frame clock, a data signal (providing the decoded data), a bit clock (providing a clocking signal for the system) and various signals used for the detection of the preambles illustrated in FIG. 4.

Figure 7:
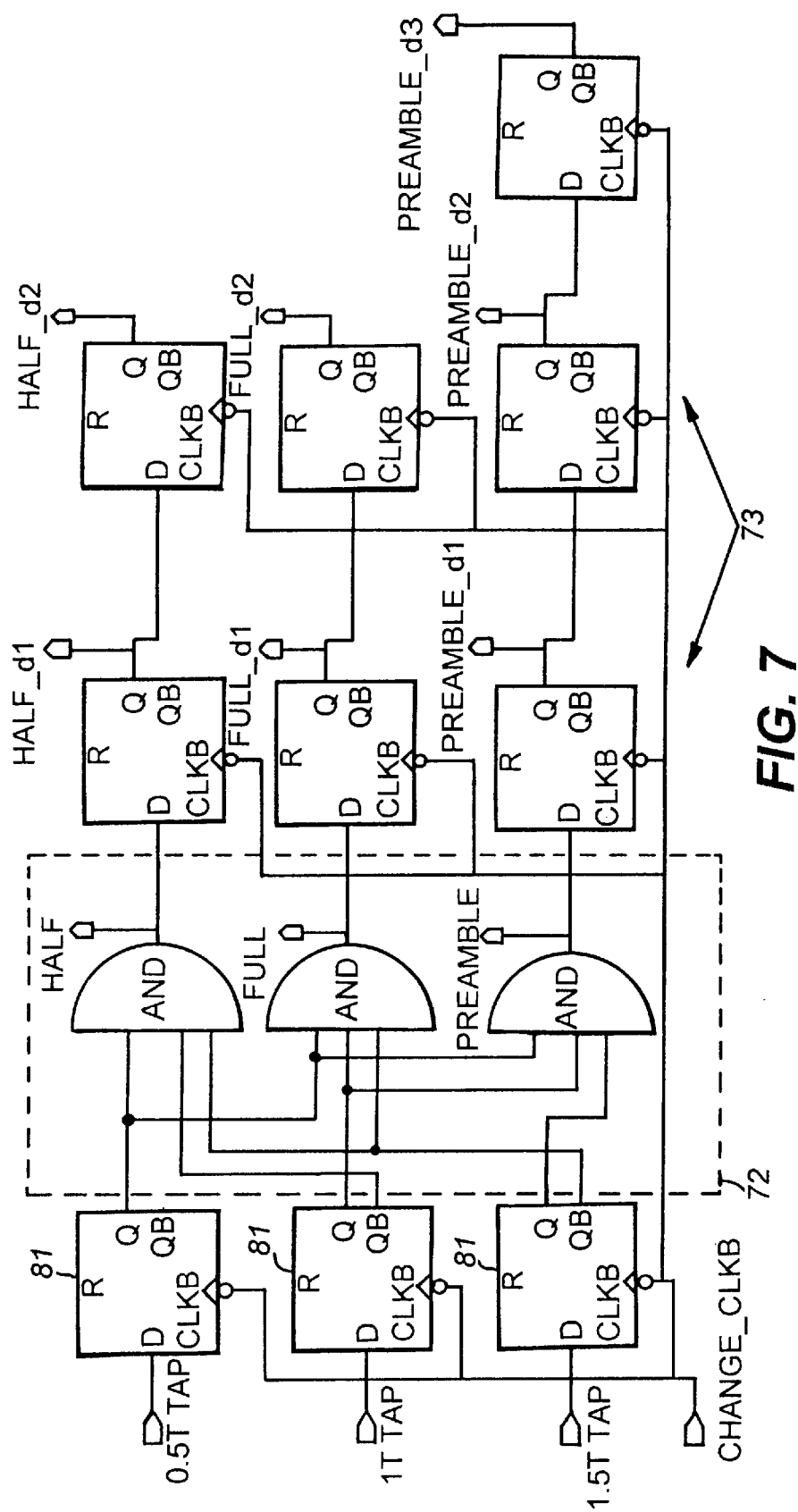
FIG. 7 is a block diagram of a circuit for detecting the width of transmitted pulses, and for delayed storage of the detected pulses.

FIG. 7 illustrates a portion of the logic element 57. The circuit uses a clocking signal Change_clkB, which is provided from the output of the change detector 51. The 0.5T tap 53a, 1T tap 53b, and 1.5T tap 53c, are separately coupled to three D flip flops 71. This permits latching of the values at the respective taps 53a to 53c, before the shift register is reset (after a delay introduced by delay element 52, as described above). Logic gates 72 then combine the signals to produce a signal corresponding to the detection of a half-cell, full-cell or preamble (1.5T cell) pulse. Additional D flip flops 73 are provided to permit detection of the three preambles illustrated in FIG. 4.

Figure 8:
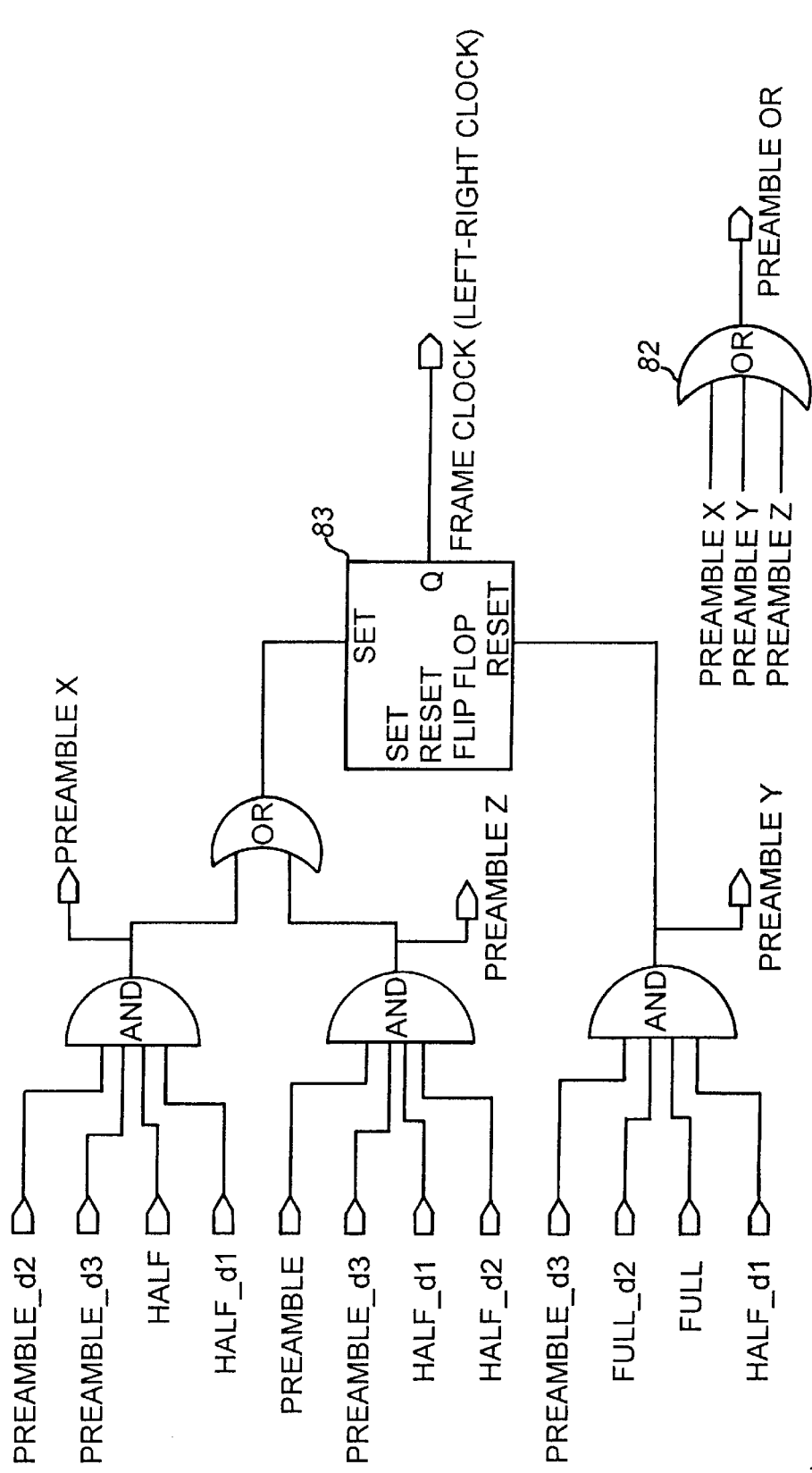
FIG. 8 is a block diagram of a circuit, according to the present invention, that translates signals provided by the circuit of FIG. 7 to provide signals for preamble detection and for a frame signal clock.

FIG. 8 illustrates a logic circuit that generates a Preamble X signal, to indicate when preamble X has been detected, a Preamble Z signal, to indicate when preamble Z occurs, and a Preamble Y signal, to indicate when preamble Y has been detected. The circuit further includes a logical OR-gate 82 to provide a signal that indicates that a preamble has been detected. The circuit also includes an RS flip flop 83 to provide a frame clock signal.

Figure 9:
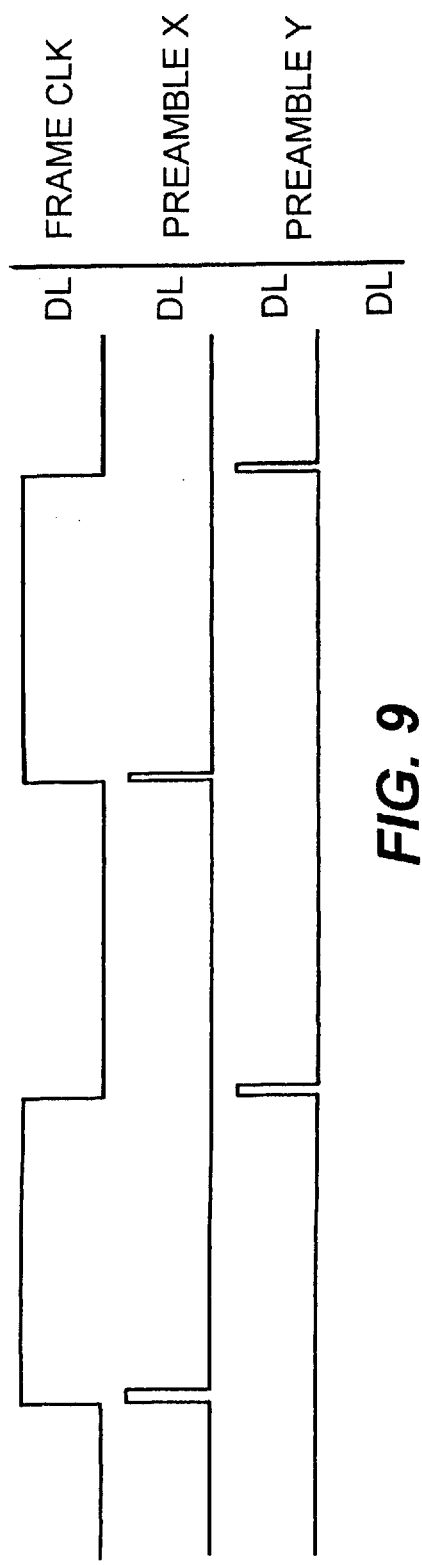
FIG. 9 is an example of operation of the circuit of FIG. 8.

FIG. 9 illustrates an example of an output from the circuit of FIG. 8. As illustrated, the frame clock has an upward edge transition when a preamble X has been detected. (The frame clock also will have an upward edge when preamble Z is detected.) The frame clock has a downward edge when preamble Y is detected.

Figure 10:
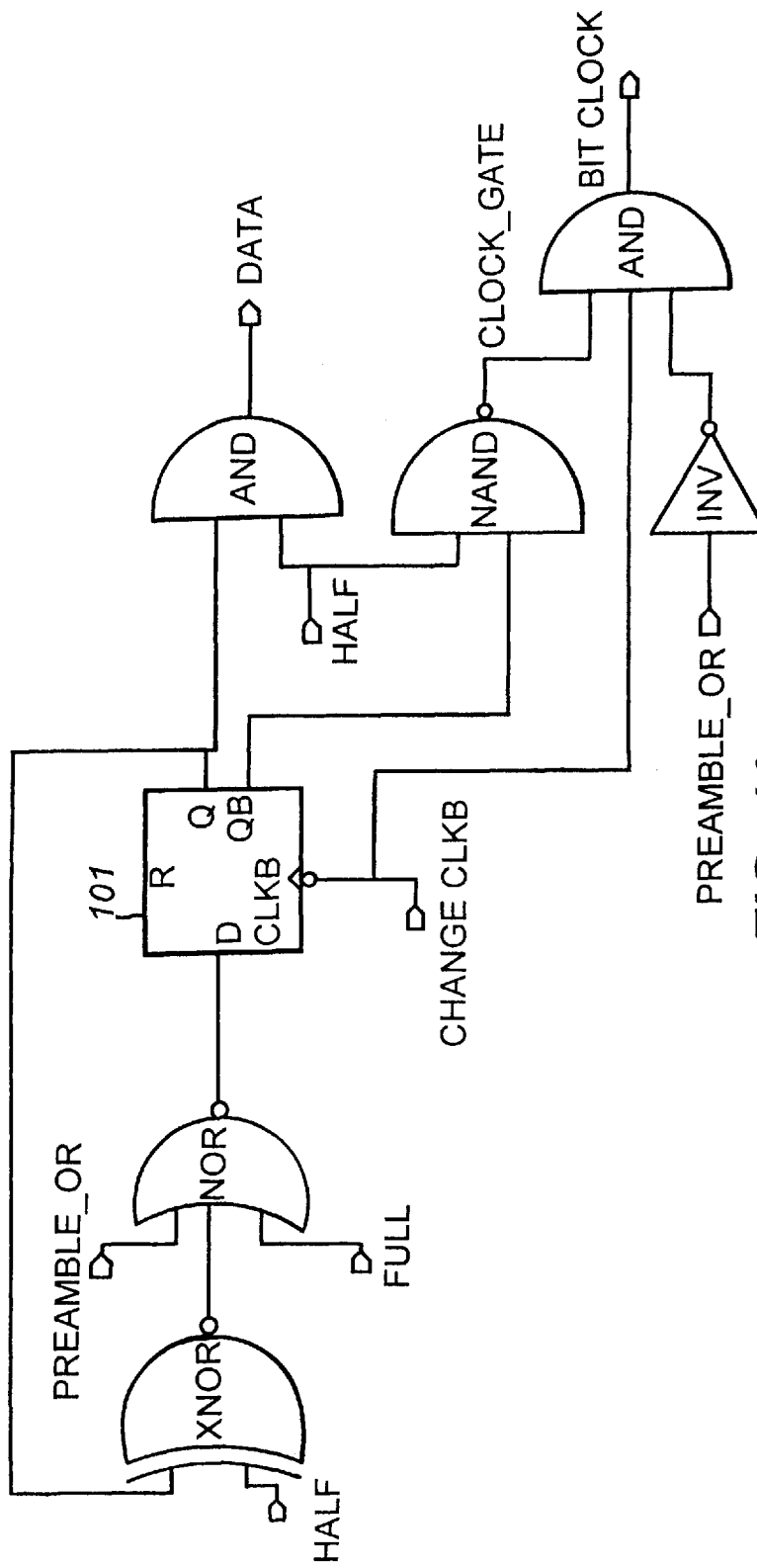
FIG. 10 is a block diagram of a circuit for translating the outputs of the circuit of FIGS. 7 and 8 to produce a bit clock and to extract data.

FIG. 10 illustrates a circuit for recovering data in the bit clock from the incoming signal. The circuit takes as inputs the half, full and preamble_OR signals produced by the circuit illustrated in FIG. 8. The circuit includes a D flip flop 101 that is clocked from the Change_clkB signal, provided from the change detector 51.

Figure 11:
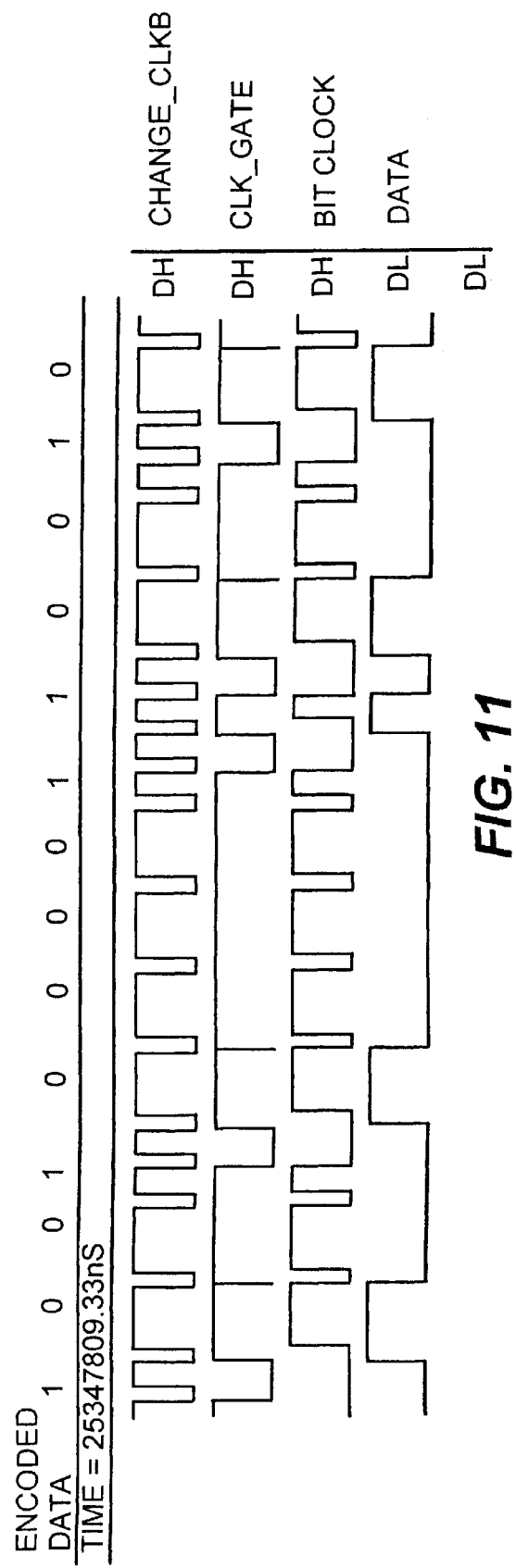
FIG. 11 illustrates an example of operation of the circuit of FIG. 10.

FIG. 11 illustrates an example of the outputs of the circuit of FIG. 10, during operation.

Having thus described at least one illustrative embodiment of the invention, various modifications and improvements will readily occur to those skilled in the art and are intended to be within the scope of the invention. Accordingly, the foregoing description is by way of example only and is not intended as limiting. The invention is limited only as defined in the following claims and the equivalents thereto.

What is claimed is:

1. A circuit for decoding an input signal, comprising:
    a measurement circuit, having an input to receive a timing clock signal that is asynchronous with clocking of the input signal, to measure duration of a plurality of pulses received on the input signal in relation to a frequency of the timing clock signal;
    a decode circuit, coupled to the measurement circuit, to decode the input signal into the digital data; and
    a servo mechanism, having an input to receive a master clock signal, to provide the timing clock signal having a frequency that varies in response to variations in frequency of clocking of data on the input signal.

2. The circuit of claim 1, wherein the decode circuit comprises a circuit to decode the input signal, the input signal including digital data encoded according to a coding scheme having a maximum pulse width for the encoded data and including at least one extended pulse having a width greater than the maximum pulse width.

3. The circuit of claim 2, wherein the servo mechanism includes only digital components.

4. The circuit of claim 2, wherein the servo mechanism comprises:
    a digitally controlled oscillator, having a digital frequency control input, to produce the timing clock signal having a frequency corresponding to a value on the digital frequency control input; and
    a feedback circuit, coupled to the digital frequency control input of the digitally controlled oscillator, to provide the value on the digital frequency control input, the value varying in proportion to variation in the length of a plurality of the at least one extended pulses.

5. The circuit of claim 4, wherein the feedback circuit includes a counter having an output coupled to the digitally controlled oscillator and an input coupled to the measurement circuit.

6. The circuit of claim 5, wherein:
    the measurement circuit includes a shift register having a reset input to receive a reset signal to reset the shift register when a transition is detected on the input signal, a clock input to receive the timing clock signal, and a plurality of tap outputs.

7. The circuit of claim 6, wherein:
    the input of the counter is coupled to one of the tap outputs of the shift register; and
    the counter includes a circuit to count up at an increment value when the input of the counter has a first input value and to count down at a decrement value when the input of the counter has a second input value.

8. The circuit of claim 7, wherein the decrement value and the increment value have substantially different magnitudes.

9. A circuit for decoding an input signal that includes digital data encoded according to a coding scheme having a maximum pulse width for the encoded data and including at least one extended pulse having a width greater than the maximum pulse width, the circuit comprising:
    a measurement circuit to measure a width of each of a plurality of pulses received on the input signal relative to the width of the at least one extended pulse, the measurement circuit including a servo mechanism to track and compensate for changes in frequency of clocking of the encoded data on the input signal, the changes being detected by detection of changes in duration of a plurality of extended pulses on the input signal, the servo mechanism including a digitally controlled oscillator; and a decode circuit, coupled to the measurement circuit, to decode the input signal into the digital data, the decode circuit including a circuit to decode at least one of SPDIF standard encoded data and AES/EBU standard encoded data.

10. The circuit of claim 9, wherein the servo mechanism includes only digital components.

11. A circuit for decoding an input signal that includes biphase-mark encoded digital data having a maximum pulse width for the encoded data and including at least one extended pulse having a width greater than the maximum pulse width, the circuit comprising:

a circuit to derive a bit clock signal from the input signal; and a decode circuit to decode the biphase-mark encoded data, including a servo mechanism to track and compensate for changes in frequency of clocking of data on the input signal; and wherein the servo mechanism includes a digitally controlled oscillator.

12. The circuit of claim 11, wherein the servo mechanism includes only digital components.

13. The circuit of claim 11, wherein the decode circuit includes a circuit to decode at least one of SPDIF standard encoded data and AES/EBU standard encoded data.

14. A method of decoding an input signal that includes digital data encoded according to a coding scheme having a maximum pulse width for the encoded data and including at least one extended pulse having a width greater than the maximum pulse width, the method comprising the steps of:

measuring a duration of each of a plurality of pulses on the input signal;

decoding the input signal based on the measured duration of the pulses; and wherein the measuring step comprises a step of providing a timing clock signal having a frequency that varies in response to variations in a frequency of clocking of the input signal.

15. The method of claim 14, wherein the measuring step comprises the steps of:

providing the timing clock signal asynchronously from clocking of the input signal; and measuring the duration of the plurality of pulses in relation to the timing clock signal.

16. The method of claim 15 further comprising the step of deriving a bit clock signal directly from locations of a plurality of edges in the input signal.

* * * * *